(12) United States Patent  (10) Patent No.: US 12,019,938 B2
Liu  (45) Date of Patent: Jun. 25, 2024

(54) INFORMATION PROCESSING METHOD AND ELECTRONIC DEVICE

(71) Applicant: Lenovo (Beijing) Limited, Beijing (CN)

(72) Inventor: Xiaoqing Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/941,106

(22) Filed: Sep. 9, 2022

(65) Prior Publication Data

US 2023/0214163 A1 Jul. 6, 2023

(30) Foreign Application Priority Data

Dec. 31, 2021 (CN) .......................... 202111679142.1

(51) Int. Cl.
    *G06F 3/14* (2006.01)
    *G06F 3/0482* (2013.01)
(52) U.S. Cl.
    CPC .............. *G06F 3/14* (2013.01); *G06F 3/0482* (2013.01)
(58) Field of Classification Search
    CPC ................................. G06F 3/14; G06F 3/0482
    See application file for complete search history.

(56) References Cited

U.S. PATENT DOCUMENTS

| | | | | |
|---|---|---|---|---|
| 9,280,274 B2* | 3/2016 | Nishina | .................. | G06F 3/0488 |
| 10,607,375 B2* | 3/2020 | Fox | ........................ | G09G 5/005 |
| 2009/0070711 A1* | 3/2009 | Kwak | .................... | G06F 3/0485 |
| | | | | 715/829 |
| 2010/0162175 A1* | 6/2010 | Lee | ........................ | G06F 3/0482 |
| | | | | 707/E17.014 |
| 2012/0144342 A1* | 6/2012 | Yu | .......................... | G06F 3/0485 |
| | | | | 715/830 |
| 2013/0067393 A1* | 3/2013 | Demopoulos | .......... | G06F 3/0488 |
| | | | | 715/784 |
| 2013/0106914 A1* | 5/2013 | Jain | ........................... | G09G 5/34 |
| | | | | 345/666 |
| 2014/0009425 A1* | 1/2014 | Wang | .................... | G06F 3/0416 |
| | | | | 345/173 |
| 2014/0189580 A1* | 7/2014 | Kawamata | ............ | G06F 3/0485 |
| | | | | 715/784 |
| 2015/0220243 A1* | 8/2015 | Yang | ...................... | G06F 1/3265 |
| | | | | 715/856 |
| 2020/0333932 A1* | 10/2020 | Lee | ........................ | G06F 1/1652 |
| 2023/0074701 A1* | 3/2023 | Kim | ......................... | G09G 3/20 |

* cited by examiner

*Primary Examiner* — Bryan Earles
(74) *Attorney, Agent, or Firm* — ANOVA LAW GROUP, PLLC

(57) ABSTRACT

An information method includes obtaining a display object and a display area, wherein the display area is at least part of a display output area of a display screen; displaying the display object in the display area; changing a display state of the display object in the display area in response to an input operation, wherein the input operation includes at least a moving operation; and determining that the display state of the display object satisfies a target display state, and that the display object in the target display state includes a target item responding to the moving operation, stopping an edge of the display object in the target display state within the display area.

20 Claims, 13 Drawing Sheets in response to the moving operation, control to scroll the list and to change the display area from a first area to a second area, where the first area includes the second area — 31 when the list stops scrolling, control the end item of the list to coincide with a boundary of the second area — 32

INFORMATION PROCESSING METHOD AND ELECTRONIC DEVICE

CROSS-REFERENCE TO RELATED APPLICATION

The present disclosure claims the priority of Chinese Patent Application No. 202111679142.1, filed with the State Intellectual Property Office of P. R. China on Dec. 31, 2021, the entire content of which is incorporated herein by reference.

TECHNICAL FIELD

The present disclosure relates to the technical field of image display and, more particularly, to an information processing method and an electronic device.

BACKGROUND

With the continuous development of science and technology, increasing numbers of electronic devices with display functions have been widely used, brought great convenience to people's daily life and work and become an indispensable tool.

The main component of the electronic device to realize the display function is the display screen. For example, an electronic device can display, e.g., a list of an application. A stop position of an edge of a display object, e.g., the list displayed by the application, is fixed relative to an interactive interface of the application or relative to the window of the application. There is only one manner for displaying display object, which greatly reduces the use efficiency of electronic device.

SUMMARY

In accordance with the disclosure, one aspect of the present disclosure provides an information processing method. The method includes obtaining a display object and a display area, wherein the display area is at least part of a display output area of a display screen; displaying the display object in the display area; changing a display state of the display object in the display area in response to an input operation, wherein the input operation includes at least a moving operation; and determining that the display state of the display object satisfies a target display state, and that the display object in the target display state includes a target item responding to the moving operation, stopping an edge of the display object in the target display state within the display area.

Also, in accordance with the disclosure, another aspect of the present disclosure provides an electronic device. The electronic device includes a display screen and a processor. The processor is configured to obtain a display object and a display area, wherein the display area is at least part of a display output area of the display screen; control the display screen to display the display object in the display area; change a display state of the display object in the display area in response to an input operation, wherein the input operation includes at least a moving operation; and determining that the display state of the display object satisfies a target display state, and that the display object in the target display state includes a target item responding to the moving operation, control the display screen to stop an edge of the display object in the target display state within the display area.

DESCRIPTION OF THE DRAWINGS

In order to illustrate the embodiments of the present disclosure more clearly, the following briefly introduces the accompanying drawings that are used in the description of the embodiments. The drawings in the following description show some embodiments of the present disclosure. For those of ordinary skill in the art, other drawings can also be obtained according to the provided drawings without any creative effort.

The structures, proportions, sizes, etc. shown in the drawings of the present disclosure are used to cooperate with the contents disclosed in the specification for the understanding and reading of those who are familiar with the technology, and are not intended to limit the conditions that the present disclosure can be implemented. Any structural modification, proportional relationship change or size adjustment without technical substantive significance and without affecting the effect that the present disclosure can produce and the purpose that can be achieved should still fall within the scope of the technology disclosed in the present disclosure

DETAILED DESCRIPTION

The embodiments of the present disclosure are clearly and completely described below with reference to the accompanying drawings in the embodiments of the present disclosure. The described embodiments are only a part of the embodiments of the present disclosure, but not all of the embodiments. Based on the embodiments in the present disclosure, all other embodiments obtained by those of ordinary skill in the art without creative efforts shall fall within the protection scope of the present disclosure.

As described in the background art, when an electronic device performs a display function, the stop position of an edge a display object displayed by an application is usually located at a fixed boundary of an interactive interface or a window of the application.

Figure 1:
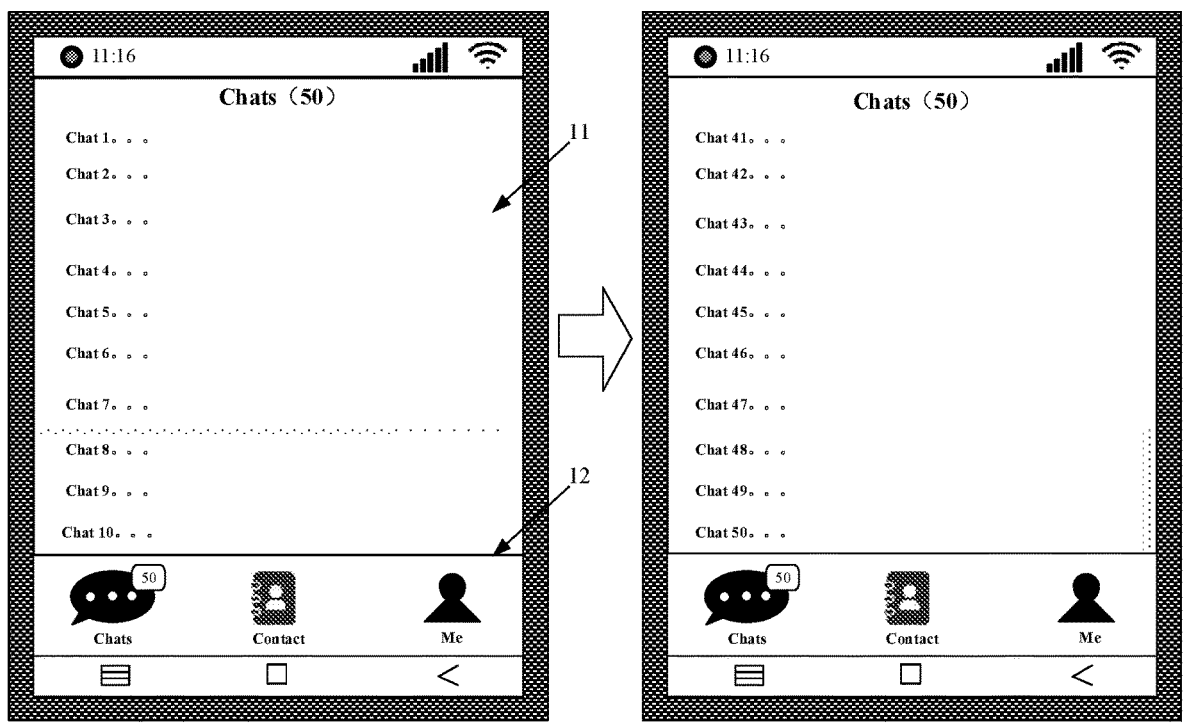
FIG. 1 is a schematic diagram of an electronic device displaying a display object.

FIG. 1 is a schematic diagram of an electronic device displaying a display object. The electronic device may be used to view chat information including, e.g., 50 chat messages. When each chat message is displayed one by one based on user operations, the stop position of the last chat message (i.e., chat message 50) can only be on the preset edge 12 of the display area 11 configured for the chat message program.

In view of the above, the embodiments of the present disclosure provide an information processing method and an electronic device. The information processing method includes the following steps.

A processor obtains a display object and a display area, where the display area is at least part of a display output area of a display screen.

The processor controls the display screen to display the display object in the display area; changing a display state of the display object in the display area in response to an input operation, where the input operation includes at least a moving operation.

If the display state of the display object satisfies a target display state, and the display object in the target display state includes a target item responding to the moving operation, an edge of the display object in the target display state is stopped within the display area.

The technical solution of the present disclosure can stop the edge of the display object in the target display state within the display area, and the edge of the display object can be set based on the state of the target item.

In order to make the above objects, features and advantages of the present disclosure more clearly understood, the present disclosure are described in further detail below with reference to the accompanying drawings and specific embodiments.

Figure 2:
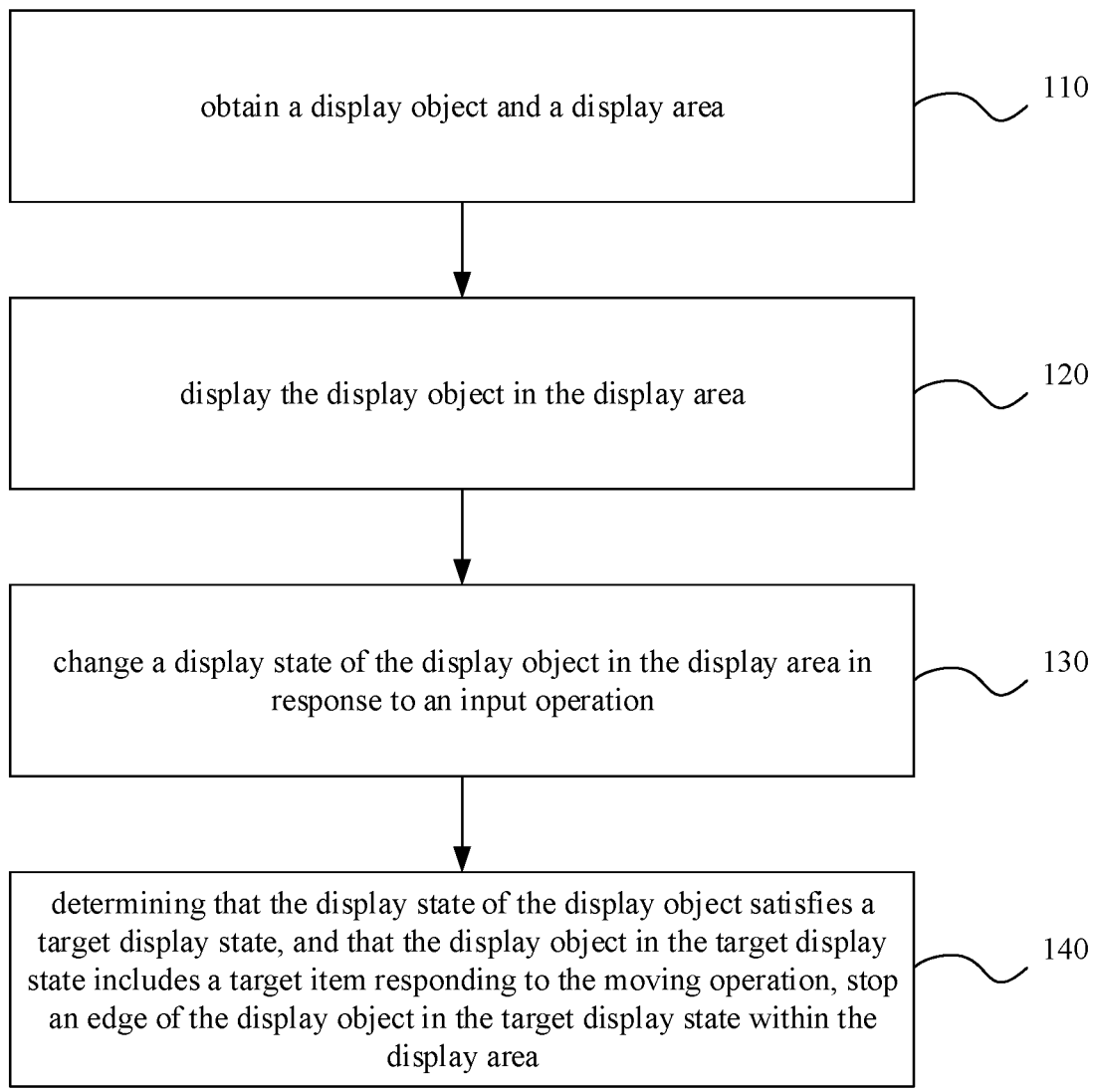
FIG. 2 is a schematic flowchart of an information processing method according to some embodiments of the present disclosure.

FIG. 2 is a schematic flowchart of an information processing method according to some embodiments of the present disclosure. The method can be applied to an electronic device with a display screen, and the information processing method includes following steps.

A processor of the electronic device obtains a display object and a display area (110).

The display area is at least part of a display output area of the display screen.

When the electronic device performs a display function, a view component in an operating system of the electronic device is called by an application to configure the display area for the display object (e.g., a list) of the application.

The processor controls the display screen to display the display object in the display area (120).

The processor controls to change a display state of the display object t in the display area in response to an input operation (130).

For example, the input operation includes at least a moving operation.

If the display state of the display object satisfies a target display state, and the display object in the target display state includes a target item responding to the moving operation, the processor stops an edge of the display object in the target display state within the display area (140).

In the embodiments of the present disclosure, the information processing method can stop the edge of the display object in the target display state within the display area, and can set the edge of the display object based on the state of the target item.

The information processing method is applicable when the display area required for the display object exceeds the display area, and the display area can only display part of the content of the display object.

The operating system of the electronic device configures the display area for the application. In one solution, as shown in FIG. 1, the display area 11 is fixed, and the stop position of the edge of the display object is at a preset boundary 12 of the display area. The technical solution of the present disclosure can stop the edge of the display object in the target display state within the display area, and the edge of the display object can be set based on the state of the target item.

The display area has a first boundary, and the display object can be scrolled and displayed in the display area to the opposite boundary of the first boundary based on the moving operation. If the display state of the display object satisfies the target display state, and the display object in the target display state includes the target item responding to the moving operation, the edge of the display object displaying the target display state can be stopped within the display area, and the edge of the display object can be displayed by the display output area of the display screen.

In the information processing method, the target display state is that an end item of the list coincides with the first boundary of the display area, and the display object is the list. According to the information processing method, after the end item of the list coincides with the first boundary of the display area, different from a technique where the edge of the list has to stop at the first boundary, and the end item of the list can also overlap the first boundary of the display area as the target display state, the list in the target display state can be used as the target item responding to the moving operation, and the edge of the list in the target display state can be stopped in the display area. That is, after the moving operation is completed, the edge of the list can be kept in the display area.

When the display state of the display object does not meet the target display state, and the target item has not been moved to the first boundary of the display area, the display object can continue to move in response to the moving operation.

Figure 3:
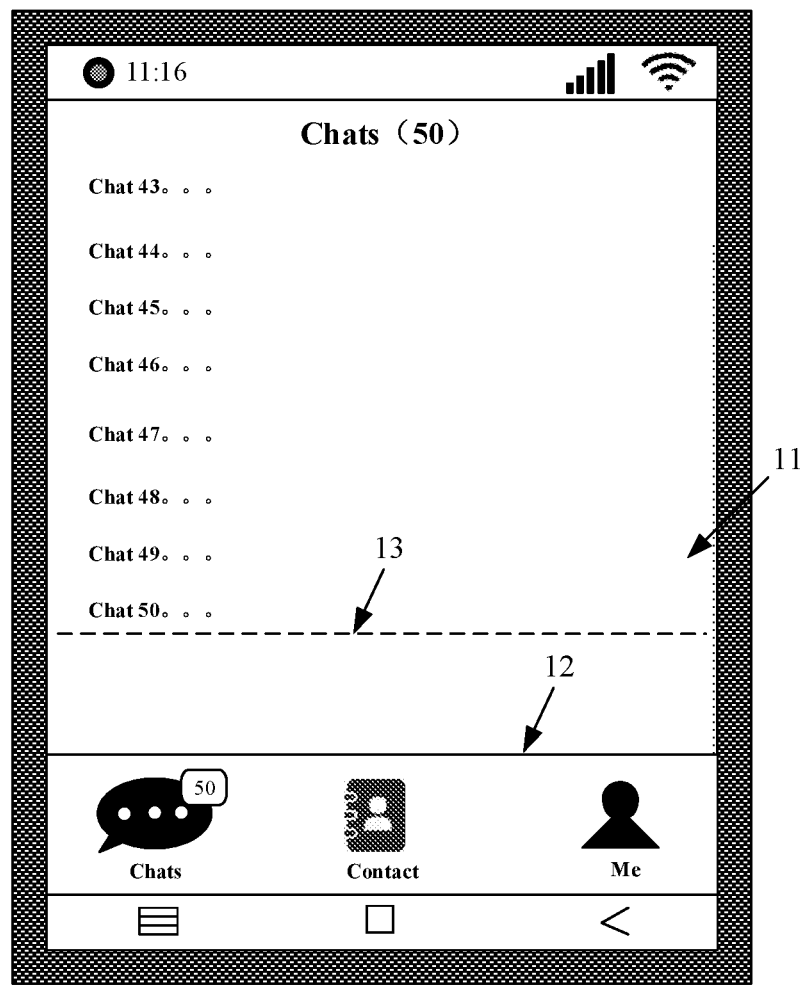
FIG. 3 is a schematic diagram of a display object displayed by an electronic device according to some embodiments of the present disclosure.

FIG. 3 is a schematic diagram of a display object displayed by an electronic device according to some embodiments of the present disclosure. As shown in FIGS. 1 and 3, the operating system of the electronic device configured the display area 11 for the application program, and the display area 11 has a first boundary 12. When the list is being moved in the display area 11, as shown in the right figure in FIG. 1, if the end item (chat information 50) of the list coincides with the first boundary 12 of the display area, the list is in the target display state. As shown in the right figure in FIG.

1, the list in the target display state includes the target item that responds to the moving operation. Further in response to the input operation, the edge 13 of the target item in the target display state can be stopped in the display area 11. As shown in FIG. 3, the end of the list can be further moved upwards with respect to the first boundary 12, and stopped within the display area 11. The display object of the application program in the embodiment of the present disclosure is a list. A number of data items in the list is greater than or equal to a number of data items that can be carried by the display area corresponding to the list view of the operating system called by the application program. For example, the number of data items of the list that can be carried by the list view of the operating system is 6, and the number of data items in the list is greater than or equal to 6. Therefore, whether the display state of the list belongs to the target display state can be further determined.

The edge 13 in FIG. 3 is used to indicate the edge of the display object. In the actual display image, other graphic lines that are different from the graphic line of the boundary 12 may be used to indicate the edge 13, or the edge 13 may not exist and the edge 13 may be indicated by the target item.

Figure 4:
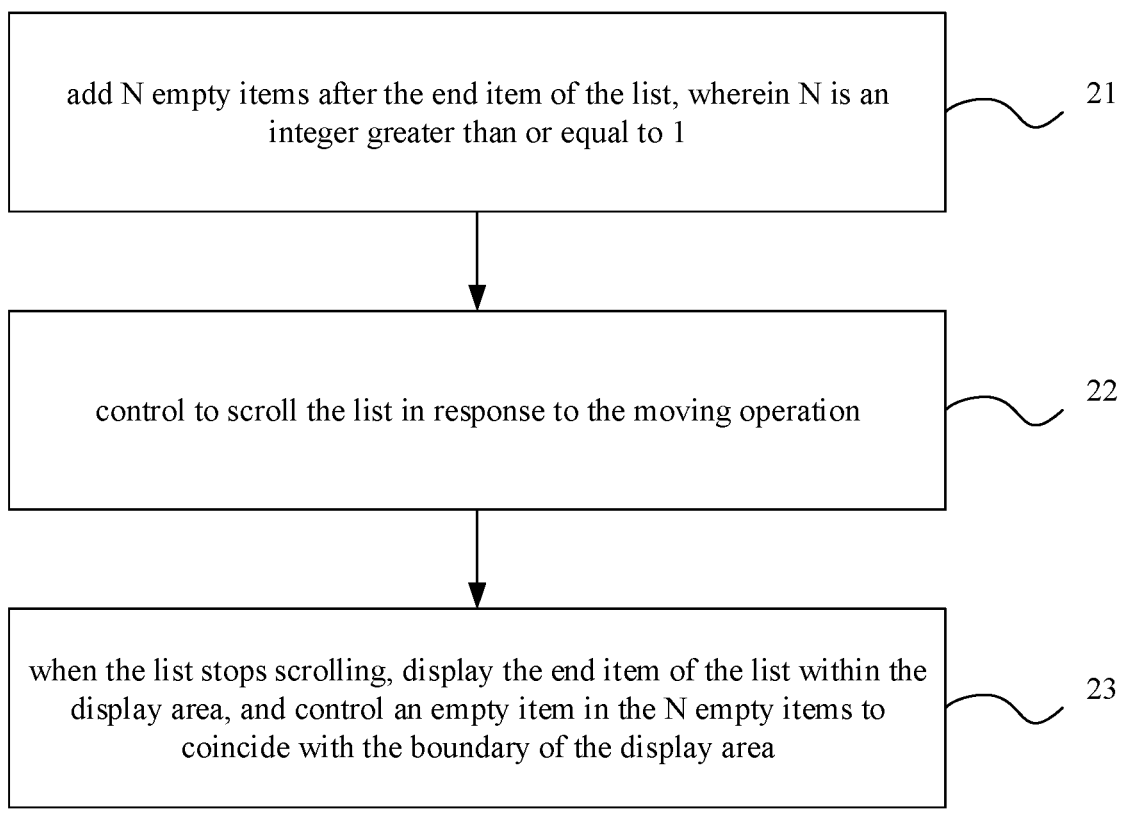
FIG. 4 is a flowchart of a method for stopping an edge of a display object in a target display state within a display area according to some embodiments of the present disclosure.

FIG. 4 is a flowchart of a method for stopping an edge of a display object in a target display state in a display area according to some embodiments of the present disclosure. If the display object in the target display state includes the target item, the method for stopping the edge of the display object in the target display state within the display area includes the following steps.

The processor adds N empty items after the end item of the list, where N is an integer greater than or equal to 1 (21).

The processor controls to scroll the list in response to the moving operation (22).

If the list stops scrolling, the end item of the list is located in the display area, the processor controls an empty item in the N empty items to coincide with the first boundary of the display area.

N is related to a distance of the end item of the list from the first boundary. For example, it can be set that when the list stops scrolling, the end item of the list has a first distance from the first boundary of the display area, and at least one item of the list can be displayed within the first distance. The first distance and the value of N may be set based on display requirements, which are not specifically limited in this embodiment of the present disclosure.

In the method shown in FIG. 4, if the display state of the list satisfies the target display state, N empty items are added after the end item of the list, so that when responding to a subsequent moving operation, the list can move into the display area relative to the first boundary of the display area and stop at a position with the preset distance from the first boundary of the display area.

The present disclosure does not limit the order of step 21 and step 22. In some embodiments, if the display state of the list meets the target display state, after scrolling the list in response to the moving operation, N empty items may be added after the end item of the list. As such, in the subsequent response to the moving operation, the list can move into the display area relative to the first boundary of the display area and stop at a position having the preset distance from the first boundary of the display area.

Figures 5, 6:
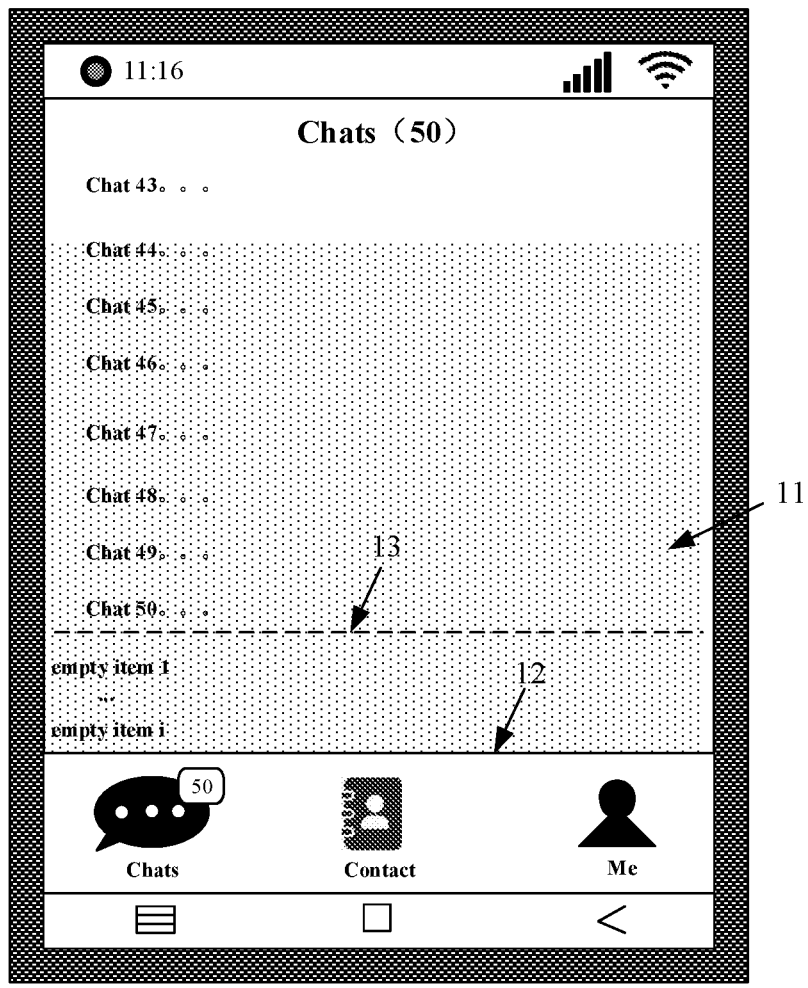
FIG. 5 is a schematic diagram of a display object displayed by an electronic device according to some other embodiments of the present disclosure.
FIG. 6 is a flowchart of another method for stopping an edge of a display object in a target display state within a display area according to some other embodiments of the present disclosure.

By adding the N empty items, after the list stops scrolling, the end item of the list can be moved to have its edge stop within the display area, as shown in FIG. 5.

FIG. 5 is a schematic diagram of a display object displayed by an electronic device according to some other embodiments of the present disclosure. N empty items are added after the end item of the list, and the N empty items are set to include empty item 1 to empty item N in sequence in the moving direction of the list. The end item is the target item. When the edge 13 of the end item moves into the display area 11, the empty item i coincides with the first boundary of the display area, and i is a positive integer not greater than N.

In this embodiment of the present disclosure, the empty item may be an item without display content, and the display effect may be as shown in FIG. 3. The empty item may also be an item with display content, which may be characters or graphics.

Using the information processing method provided by the embodiment of the present disclosure, e.g., the methods shown in FIG. 3 and FIG. 5, an operator, such as a user's finger, can perform an input operation between the edge 13 of the end item and the first boundary 11 of the display area 11, thereby solving the problem of occlusion of the bottom object by the operating body when the display object is scrolled and displayed.

In the above embodiment, the size of the display area configured for the application and the size of the display object are not changed. After the display state of the display object satisfies the target display state, it is possible to respond to the moving operation, and by adjusting the distance of the end item relative to the first boundary of the display area, the end item can be moved relative to the first boundary and stopped within the display area.

FIG. 6 is a flowchart of another method for stopping an edge of a display object in a target display state within a display area according to some other embodiments of the present disclosure. If the display object in the target presentation state includes the target item that responds to the moving operation, the method of stopping the edge of the display object in the target display state within the display area includes:

The processor controls, in response to the moving operation, to scroll the list and to change the display area from a first area to a second area, where the first area includes the second area (31).

When the list stops scrolling, the processor controls the end item of the list to coincide with the first boundary of the second area (32).

The positions of the first boundary of the first area and a first boundary of the second area are different.

According to the method shown in FIG. 6, if the display state of the display object satisfies the target display state, and the display object in the target display state includes the target item, in response to the movement operation, the size of the display area 11 can be reconfigured through the view component, so that the display area can be changed from the first area to the second area by reducing the size of the display area without changing the size of the display object. When scrolling in response to the moving operation, the end item moves relative to the first boundary and stops in the display area. At this time, the end item of the list can be moved to have its edge stop within the display area, as shown in FIG. 7.

Figure 7:
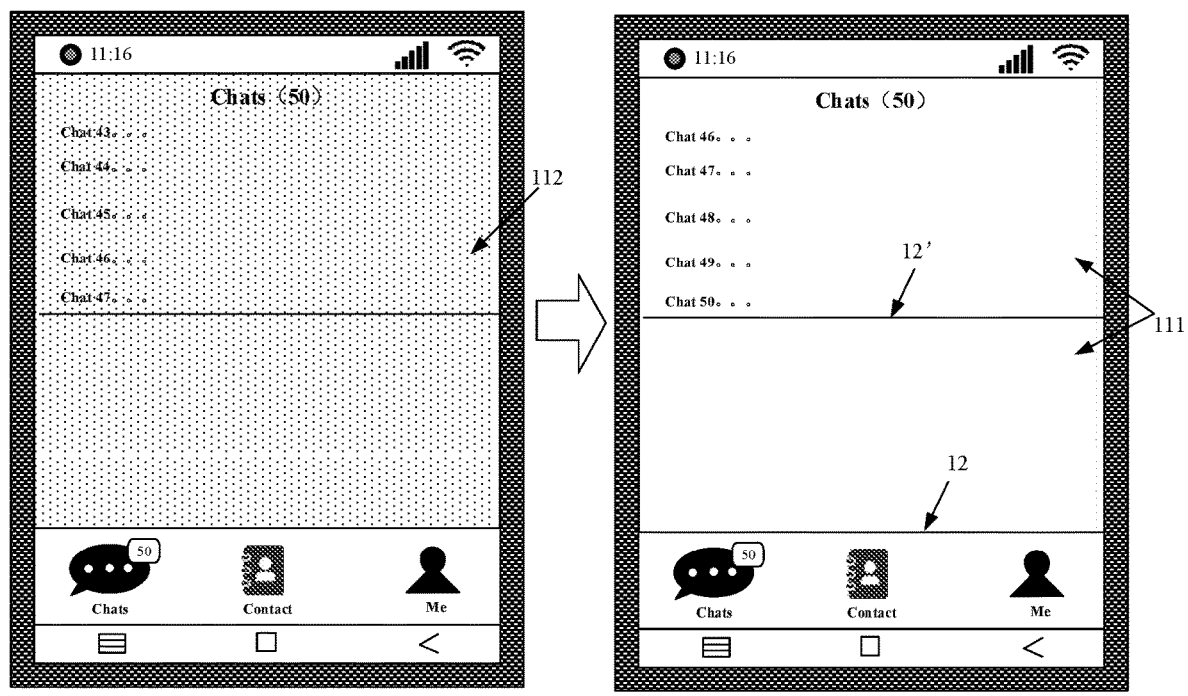
FIG. 7 is a schematic diagram of a display object displayed by an electronic device according to some other embodiments of the present disclosure.

FIG. 7 is a schematic diagram of a display object displayed by an electronic device according to some other embodiments of the present disclosure. Referring to FIGS. 1 and 7, the display object is a list. As shown in the right figure in FIG. 1, if the display state of the list satisfies the target display state, and the list in the target display state includes the target item that responds to the moving operation (i.e., the chat message 50 of the end item of the list), after obtaining the moving operation, as shown in the left figure in FIG. 7, in response to the moving operation, the list can be scrolled and the display area can be changed from the first area 111 to the second area 112. If the list stops scrolling, as shown in the right figure in FIG. 7, the end item of the list coincides with the first boundary 12' of the second area 112.

Using the information processing method provided by this embodiment of the present disclosure, as shown in FIG. 7, an operator, such as a user's finger, can perform an input operation in an area in the first area 111 but outside the second area 112, so that when the display objects are displayed in a scrolling manner, thereby preventing the occlusion of the bottom object by the operator.

In the embodiment of the present disclosure, the display screen may be a flat display screen, which is not foldable, or may be a foldable screen.

When the display screen is a foldable screen, before determining whether the display state of the display object satisfies the target display state, the information processing method further includes: obtaining sensing parameters, where the sensing parameters are used to represent the posture of the display screen; and if the sensing parameters indicate that the display screen is in the first posture, determining whether the display state of the display object satisfies the target display state. The edge of the display object in the target display state may be stopped within the display area by reducing the display area. In some embodiments, when the display screen is in the first posture and the display state of the display object satisfies the target display state, the display area is reduced based on the first posture. In some other embodiments, when the display screen is in the first posture, the display area is reduced based on a folded partition of the display screen, and then whether the display object satisfies the target display state is determined.

The display output area of the display screen includes a first display output area and a second display output area that can be bent relative to each other. When the first display output area and the second display output area are located on the same plane, the angle between the two output areas is 180 degrees. When the two output areas are facing each other, the angle between the two output areas is 0°. When the two output areas are facing away each other, the angle between the two is 360°.

The first posture is that the angle between the first display output area and the second display output area is less than 180°. In some embodiments, the first posture is that the angle between the first display output area and the second display output area is greater than 90° but less than 120°. The bending angle of the first posture of the display screen can be set based on requirements, and is not limited by the method described in the embodiments of the present disclosure.

When the sensing parameter indicates that the display screen is in the first posture, the processor determines whether the display state of the display object meets the target display state, and controls to stop the edge of the display object in the target display state within the display area, which can facilitate the user to view the display object when the display screen is folded and in the first posture.

If the sensing parameter indicates that the display screen is in a second posture, where the second posture may be that the angle between the first display output area and the second display output area is 180°, the edge of the display object may be set to be on the first boundary of the display area.

Figure 8:
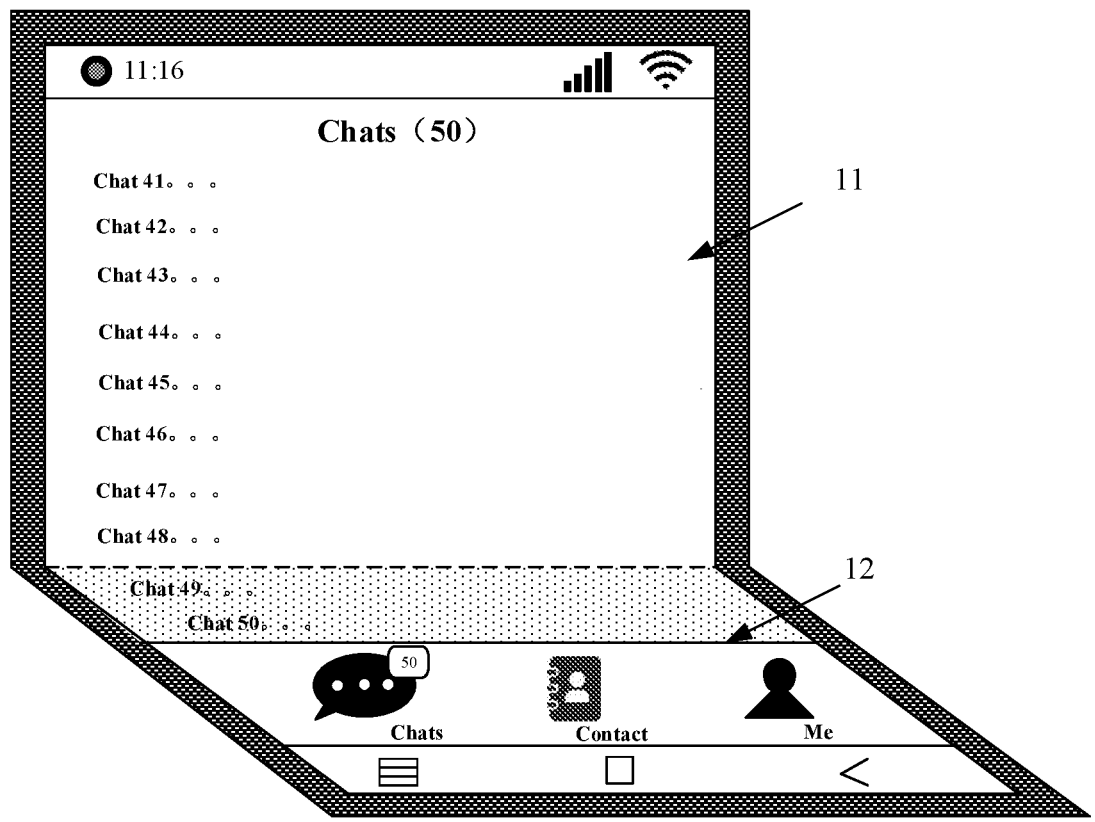
FIG. 8 is a schematic diagram of a display object displayed by an electronic device according to some other embodiments of the present disclosure.

FIG. 8 is a schematic diagram of a display object displayed by an electronic device according to some other embodiments of the present disclosure, where the list is still used as an example of the display object for description. In a general electronic device, after the display screen is bent, the display area for showing the display object is divided into two parts. The dotted line in FIG. 8 represents the folding reference line of the folding position of the display screen. For example, when the display screen is placed as shown in FIG. 8, a part of the display output area near the upper end faces the user, and a part of the display output area near the lower end is placed on a surface of a carrier object. If the edge of the display object stops at the first boundary 12 of the display area 11, the display area located in the part of the display output area at the lower end has outgoing beam to show the display object. However, the outgoing beam has a large angle with respect to the user's line of sight, so that the user cannot see the displayed content clearly. To solve this problem, one solution is to keep the user's line of sight unchanged and rotate the display screen so that a part of the display output area near the lower end can face the user. Another solution is that the display screen is kept still, the user adjusts the direction of his sight so that a part of the display output area near the lower end can face the user.

Different from the above solutions, according to the information processing method provided by the embodiment of the present disclosure, the posture of the display screen can be determined based on the sensing parameters, and when it is determined that the display screen is in the first posture, whether the display state of the display object satisfies the target display state is determined, and the edge of the display object can be stopped within the display area. As such, when the edge of the display object stops within the display area, the display object displayed in the display area are all located in the partial display output area on the same side of the folding reference line, and this partial display output area satisfies the relative relationship with the user. The relative relationship includes that the normal line of the display output area has a first included angle with the user's line of sight, a part of the display output area on the other side of the folding reference line has a second included angle with the user's line of sight, and the first included angle is smaller than the second included angle. In this way, after the display state of the display object satisfies the target display state, the edge of the end item of the display object is located in the partial display output area that satisfies the relative relationship with the user's sight line, so that the display object can be easily viewed by the user during the scroll display process.

Figure 9:
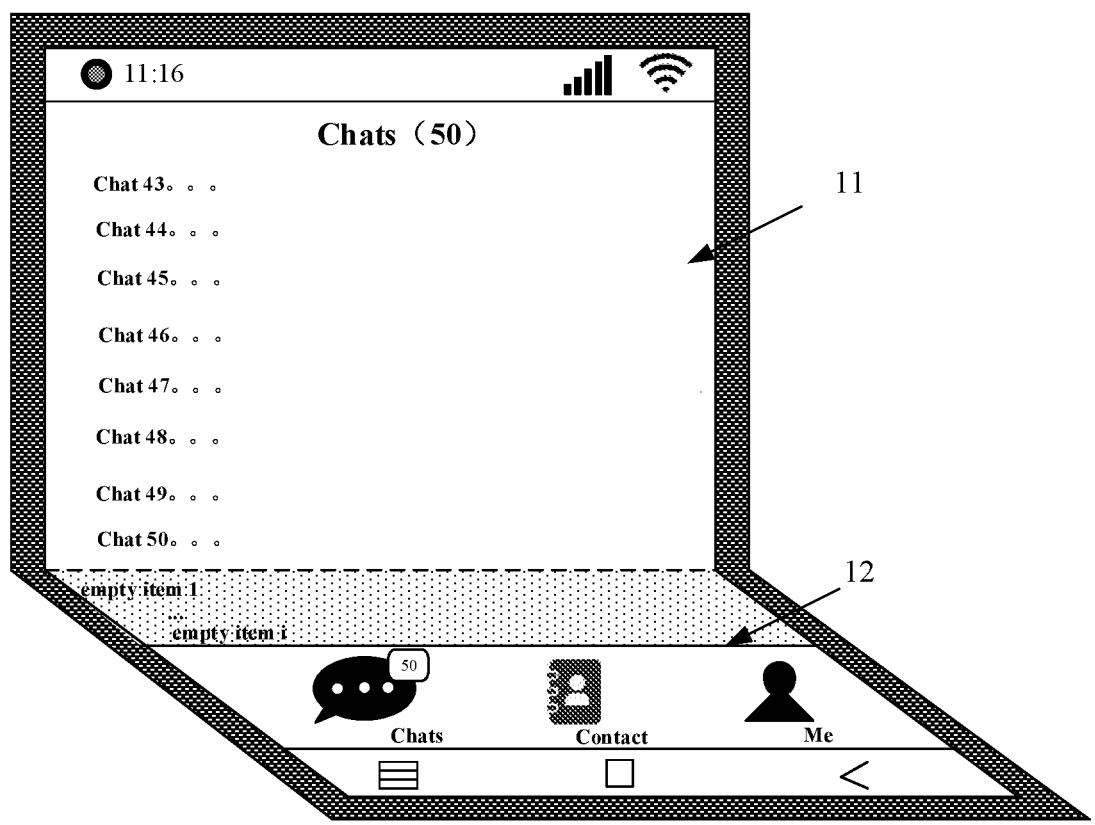
FIG. 9 is a schematic diagram of a display object displayed by an electronic device according to some other embodiments of the present disclosure.

FIG. 9 is a schematic diagram of a display object displayed by an electronic device according to some other embodiments of the present disclosure. When a foldable display screen is used, as described in the above method, N empty items can be added after the end item of the display object to adjust the stop position of the end item. For example, one of the empty items is controlled to coincide with the first boundary 12 of the display area 11, so that the end item of the display object is located on the side of the folding reference line away from the displayed empty item, and the edge of the end item can meet the coincidence condition with the folding reference line, that is, the two coincide or the distance thereof does not exceed the preset threshold.

Figure 10:
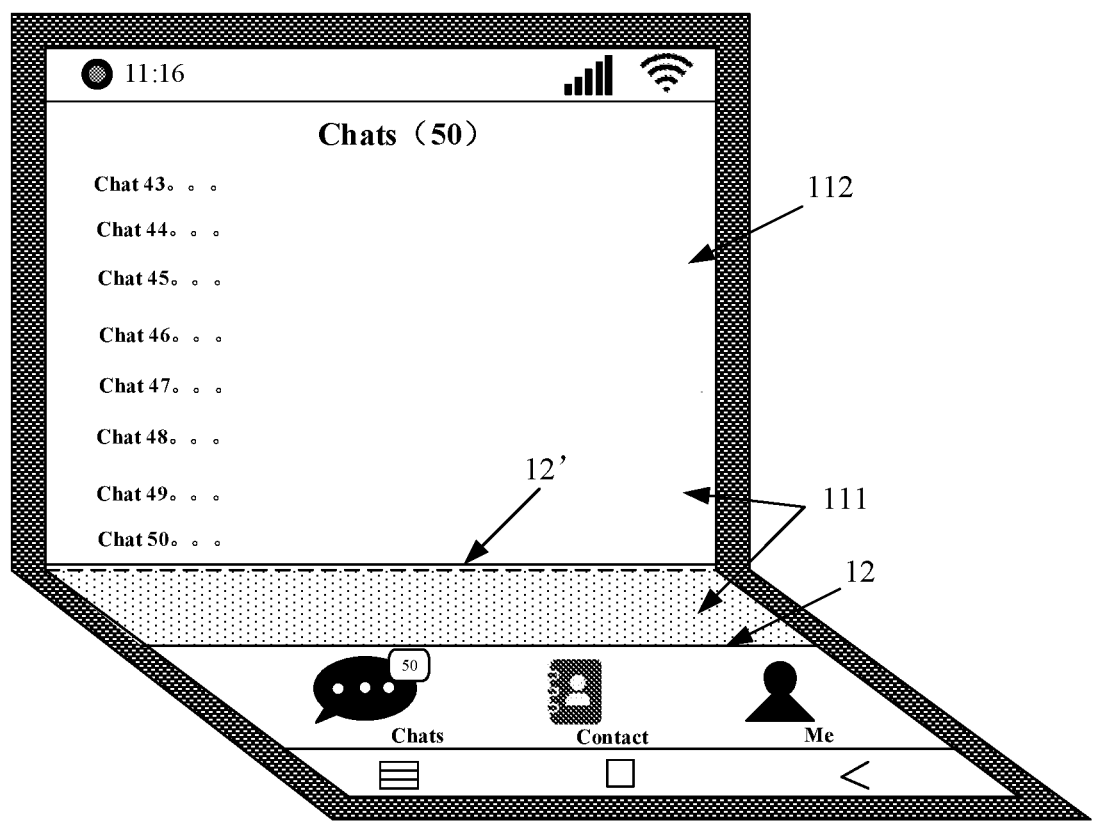
FIG. 10 is a schematic diagram of a display object displayed by an electronic device according to some other embodiments of the present disclosure.

FIG. 10 is a schematic diagram of a display object displayed by an electronic device according to some other embodiments of the present disclosure. When a foldable display screen is used, according to the above method, the display area 11 can be reduced to adjust the stop position of the end item. For example, the display area 11 is reduced from the first area 111 to the second area 112, and after the display object scrolls in the second area 112, the stop position of the end item is located at the first boundary 12' of the second area 112. The first boundary 12' of the second area 112 may meet the coincidence condition with the folding reference line.

In the embodiment of the present disclosure, the display object is the display information of the application program, and the application program can be set to occupy the display output area of the display screen to the maximum extent. The stop position of the end item is related to the folding position of the display screen in the first posture. The end item may be controlled to be located at the partial display output area at one side of the folding position. This partial display output area and the user's sight line satisfy the relative relationship, so that the display object can be easily displayed to the user when the display object is displayed in a scrolling manner.

The list is used as the display object, and may be a list of application programs. The application program occupies the display output area of the display screen to the maximum extent. For example, the display output area of the display screen includes a function bar, and the display output area except the area of the function bar is used for displaying the application program. The stop position of the end item of the list is related to the folding position in the first posture. As such, display object can be conveniently displayed to the user by adjusting the stop position of the end item based on the folding position.

As shown in FIGS. 8 and 9, in the embodiment of the present disclosure, the first boundary 12 of the display area 11 is parallel to the folding reference line, where the folding reference line includes (e.g., coincides with) the folding position of the display screen in the first posture.

In the embodiment of the present disclosure, the display area is a window configured by the view control component for an application program to display the display object. The interface of the application program includes the display area, and may also include some toolbars of the application program. In one example, the application program has a toolbar, and the display area is located on one side of the toolbar. In another example, the application program have two toolbars, and the display area located between the two toolbars. In the above embodiment, the entire display area is displayed by the display output area of the display screen as an example for description. In some other embodiments, the display area may also be partially displayed by the display output area of the display screen, as shown in FIG. 11.

Figure 11:
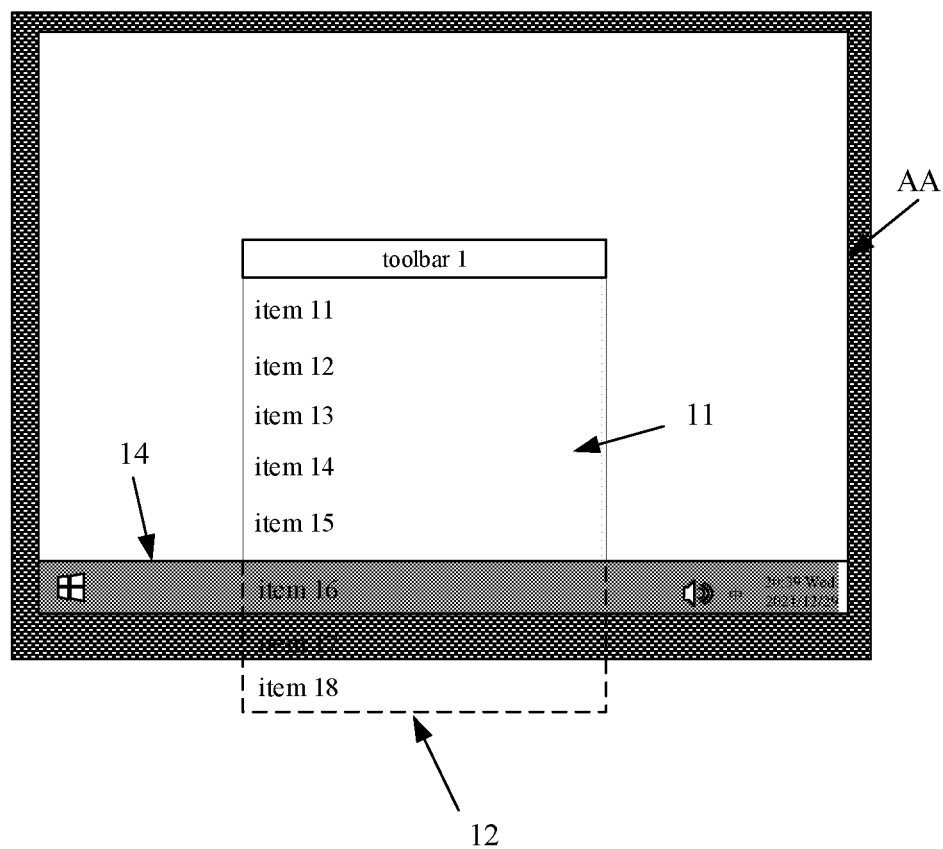
FIG. 11 is a schematic diagram of a display object displayed by an electronic device according to some other embodiments of the present disclosure.

FIG. 11 is a schematic diagram of a display object displayed by an electronic device according to some other embodiments of the present disclosure. The display output area AA of the display screen displays part of the display area 11, and another part of the display area 11 is hidden. In FIG. 11, the hidden part of the display area 11 is represented by the lower boundary of the display output area AA and the area surrounded by the dotted line, and the hidden part includes the first boundary 12 of the display area 11.

In one solution, when the display area required for the display object exceeds the display area, the display area can only display part of the content of the display object. Therefore, as shown in FIG. 11, when the display object is scrolled, if the display state of the display object satisfies the target display state, the end item can only stop at the first boundary 12 of the display area 11. The part of the display area 11 including the first boundary 12 below is hidden, the part of the display object is thus invisible. For example, the display object may include 18 objects. As shown in FIG. 11, objects 1 to 15 can be displayed through the display area 11 located in the display output area AA during the scrolling process, while objects 16 to 18 cannot be displayed because stop position of the edge of the display objects is on the first boundary 12. In order to make the last part of the display object visible, according to the above solution, the part of the display area 11 hidden below is moved into the display output area AA by dragging the display area 11 upward manually. Moreover, since the hidden part of the display area 11 includes the first boundary 12, before the first boundary 12 is dragged into the display output area AA, a size of the display area 11 cannot be reduced by dragging the first boundary 12 to have the entire display area 11 displayed in the display output area AA.

According to the information processing method provided by the embodiment of the present disclosure, the stop position of the edge of the display object is located in the display area, and is displayed by the display output area of the display screen. The method can avoid the problem that some display objects cannot be displayed when part of the display area is hidden and the part of the display area includes the first boundary of the display area, as shown in FIG. 11.

Figure 12:
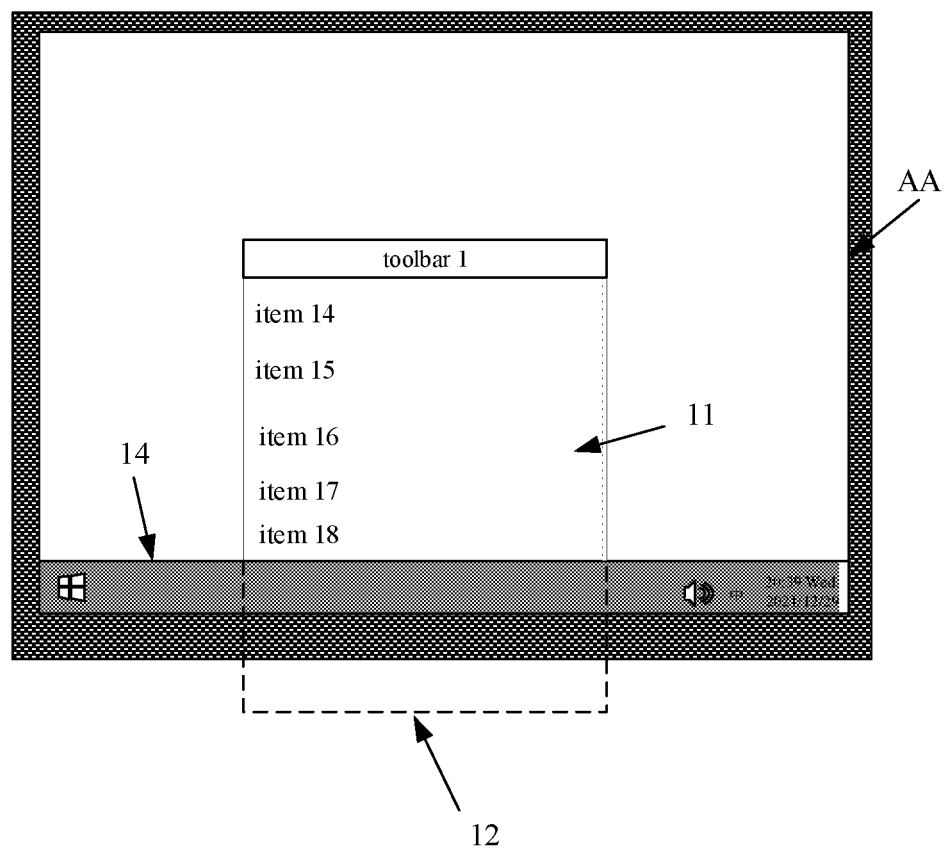
FIG. 12 is a schematic diagram of a display object displayed by an electronic device according to some other embodiments of the present disclosure.

FIG. 12 is a schematic diagram of a display object displayed by an electronic device according to some other embodiments of the present disclosure. In this method, by adding an empty item to the end item, when the display state of the display object satisfies the target display state, the end item can continue to scroll toward the display area 11 displayed by the display output area AA based on the added empty item. As such, the stop position of the end item can be located within the area displayed by the display output area AA. For example, the stop position may coincide with the boundary 14 of the display output area or have a set distance. The boundary 14 is the boundary for dividing the hidden part and the displayed part of the display output area AA.

Figure 13:
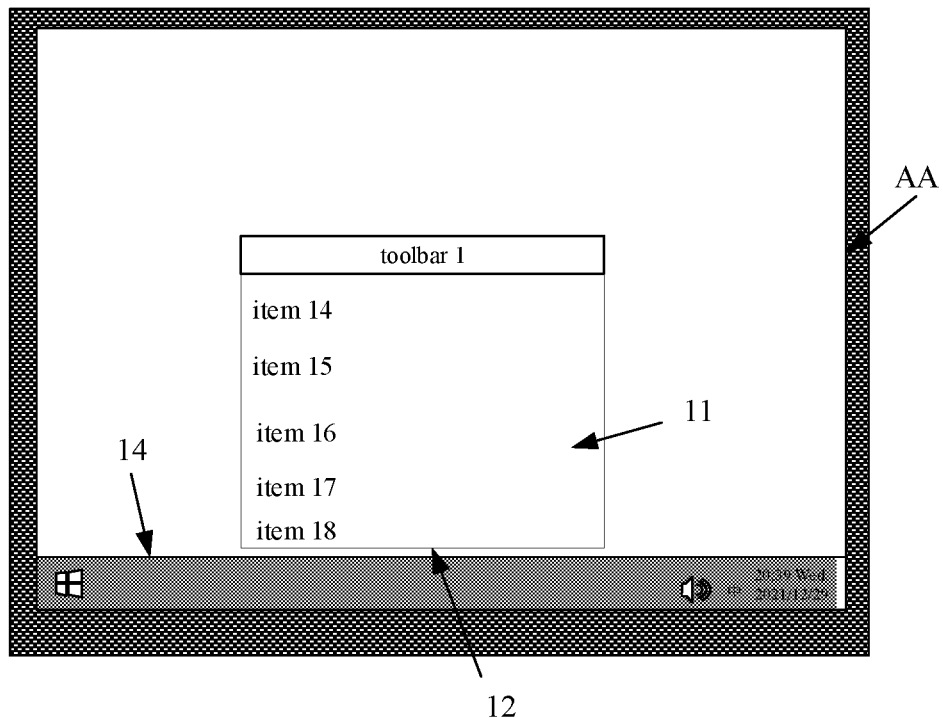
FIG. 13 is a schematic diagram of a display object displayed by an electronic device according to some other embodiments of the present disclosure.

FIG. 13 is a schematic diagram of a display object displayed by an electronic device according to some other embodiments of the present disclosure. In this method, the size of the display area 11 is changed. For example, the size of the display area 11 reduced from the display area 11 shown in FIG. 11 to the display area 111 shown in FIG. 13, so that the first boundary 12 of the display area 11 can be shown in the display output area AA, and the display area 11 can display a part of the display object. In addition, the stop position of the end item can also be located in the area displayed by the display output area AA, for example, the stop position can coincide with the boundary 14 of the display output area or have a set distance.

In the above embodiment, the list is used as the display object for description, and the list includes but is not limited to short message, address book, notification message list, and device setting list. The display object is not limited to a list, but can also include other content that needs to be scrolled and displayed in the display area of the adaptive configuration. For example, the display object can also be document information, comment information in sections on a webpage, and picture information displayed on multiple pages.

In one example, the display object may be picture information, e.g., a picture, and the required display area of the picture may be larger than the display area. The picture can be controlled to move in the display area, where a first edge of a part of the content is an edge of the image. If the first edge of the part of the content overlaps with the boundary of the display area, and there is no movement operation, the stop position of first edge of the part of the content is the first boundary of the display area. Based on the information processing method provided by the embodiment of the present application, the stop position of the first edge of the part of the content can be located in the display area, so as to facilitate the viewing of picture information.

In another example, the display object includes multiple pictures, the multiple pictures can be moved to the display area in sequence for display. In one solution, when the last picture is moved to the display area, according to the above solution, the stop position of an edge of a picture can only be the first boundary of the display area. Based on the information processing method provided by the embodiment of the present disclosure, the last picture can be moved some distance toward the previous picture position to hide part of the content, and the edge that originally stopped on the first boundary of the display area can be stopped within the display area.

Figure 14:
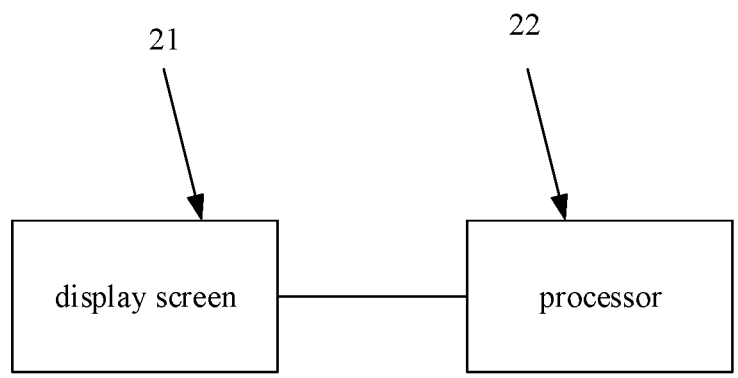
FIG. 14 is a schematic structural diagram of an electronic device according to some embodiments of the present disclosure.

Based on the foregoing embodiment, another embodiment of the present disclosure further provides an electronic device. FIG. 14 is a schematic structural diagram of an electronic device according to some embodiments of the present disclosure, including:
a display screen 21, and
a processor 22, where the processor 22 is used to obtain a display object and a display area, and control the display screen 21 to display the display object in the display area. The display area is at least a part of the display output area of the display screen 21.

In some embodiments, the processor 22 is further configured to change the display state of the display object in the display area in response to an input operation, where the input operation at least includes a movement operation.

If the display state of the display object satisfies a target display state, and the display object in the target display state includes a target item responding to the moving operation, the processor 22 is further configured to control the display screen 21 to stop the display of the edge of the display object in the target display state within the area.

In some embodiments, the display screen 21 is a touch display screen, which can sense the input operation of the user.

Figure 15:
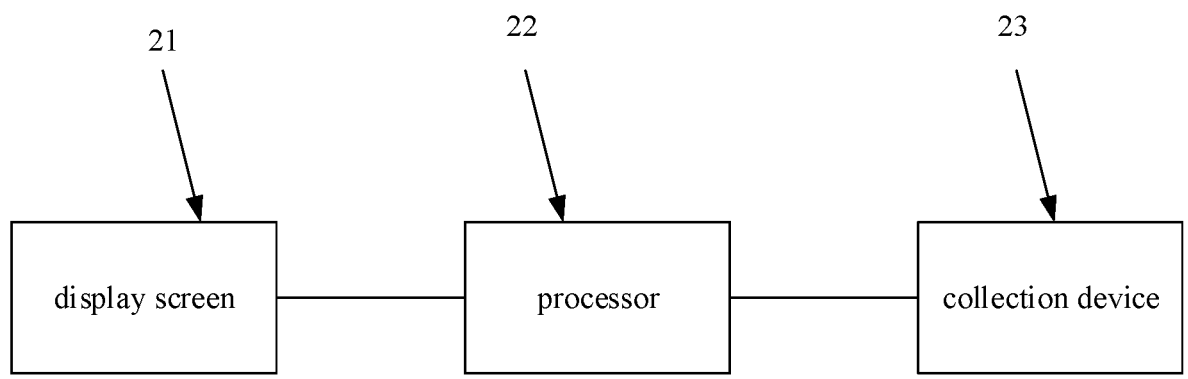
FIG. 15 is a schematic structural diagram of another electronic device according to some other embodiments of the present disclosure.

FIG. 15 is a schematic structural diagram of another electronic device according to some other embodiments of the present disclosure. Based on the electronic device shown in FIG. 14, the electronic device shown in FIG. 15 further includes: a collection device 23 for collecting sensing parameters that characterize the posture of the display screen 21.

The processor 22 is further configured to obtain sensing parameters, and if the sensing parameters indicate that the display screen 21 is in the first posture, to determine whether the display state of the display object satisfies the target display state.

As described above, the target display state is that the end item of the list coincides with the first boundary of the display area, where the display object is the list.

The list is a list of application programs. The processor 22 is used to control the application program to maximize the occupation of the display input area of the display screen 21, and to control the stop position of the end item of the list based on the folding position in the first posture. In some embodiments, the processor 22 is configured to control the first boundary of the display area to be parallel to the folding reference line, where the folding reference line includes (e.g., coincides with) the folding position of the display screen in the first posture.

In the electronic device of the embodiment of the present disclosure, the processor 22 can execute the information processing method of the above-mentioned embodiment, and can adjust the edge of the display object to be located in the display area based on the requirements.

The various embodiments in this specification are described in a progressive, or juxtaposed, or a combination of progressive and juxtaposed manner, and each embodiment focuses on the differences from other embodiments, and the same and similar parts between the various embodiments can be referred to each other. For the electronic device disclosed in the embodiment, since it corresponds to the information processing method disclosed in the embodiment, the description is relatively simple, and for relevant details, please refer to the description of the corresponding part of the information processing method.

It should be noted that, in the description of this application, the orientation or positional relationships indicated by the terms "upper," "lower," "top," "bottom," "inner," "outer," etc. are based on the orientation or positional relationships shown in the drawings, and are only for the convenience of describing the present disclosure and simplifying the description, rather than for indicating or implying that the referred device or element must have a specific orientation, be constructed and operated in a specific orientation, and therefore should not be construed as limitations on this application. When a component is said to be "connected" to another component, it can be directly connected to the other component or there may also exist an intermediate component.

It should also be noted that in this document, relational terms such as first and second are used only to distinguish one entity or operation from another, and do not necessarily require or imply any such actual relationship or sequence exists between these entities or operations Moreover, the terms "comprising," including" or any other variation thereof are intended to encompass a non-exclusive inclusion. An article or device comprising a list of elements includes not only those elements, but also other elements not expressly listed, or may also include elements inherent to the article or equipment. Without further limitation, an element defined by the phrase "comprising a . . . " does not preclude the presence of additional identical elements in an article or device that includes the above-mentioned element.

The above description of the disclosed embodiments enables any person skilled in the art to make or use the present disclosure. Various modifications to these embodiments will be readily apparent to those skilled in the art, and the generic principles defined herein may be implemented in other embodiments without departing from the spirit or scope of the present disclosure. Therefore, the present disclosure is not intended to be limited to the embodiments shown herein, but is to be accorded the widest scope consistent with the principles and novel features disclosed herein.

What is claimed is:

1. An information processing method comprising:
    displaying a list in a display area, the display area is at least part of a display output area of a display screen;
    changing a display state of the list in the display area in response to an input operation, wherein the input operation includes at least a moving operation;
    determining, in response to an end item of the list coincides with a boundary of the display area, that the display state of the list satisfies a target display state; and after determining that the display state of the list satisfies the target display state, stopping the end item of the list within the display area with a blank space between the end item of the list and the boundary of the display area, wherein when the list is stopped moving, the end item does not coincide with the boundary of the display area.

2. The method of claim 1, wherein stopping the end item of the list within the display area includes:
adding N empty items after the end item of the list, wherein N is an integer greater than or equal to 1; and
controlling to scroll the list in response to the moving operation;
wherein:
when the list stops scrolling, the end item of the list is located in the display area, and an empty item in the N empty items coincides with the boundary of the display area; and
N is related to a distance of the end item of the list from the boundary.

3. The method of claim 2, wherein the N empty items include empty item 1 to empty item N in sequence in the moving direction of the list.

4. The method of claim 1, wherein stopping the end item of the list in the target display state within the display area includes:
in response to the moving operation, controlling to scroll the list and to change the display area from a first area to a second area, where the first area includes the second area; and
when the list stops scrolling, controlling the end item of the list to coincide with a boundary of the second area;
wherein a position of a boundary of the first area and a position of the boundary of the second area are different.

5. The method of claim 4, further comprising:
obtaining sensing parameters indicative of a posture of the display screen; and
if the sensing parameters indicating that the display screen is in a first posture, determining whether the display state of the list satisfies the target display state.

6. The method of claim 5, wherein:
the list corresponds to an application program;
the application program is configured to occupy the display output area of the display screen to a maximum extent; and
the stop position of the end item is related to a folding position of the display screen in the first posture.

7. The method of claim 5, wherein the boundary of the display area is parallel to a folding reference line, where the folding reference line represents a folding position of the display screen in the first posture.

8. The method of claim 1, wherein the display output area displays the entire display area of the list.

9. The method of claim 1, wherein: the display output area displays a part of the display area of the list, a remaining part of the display area including a boundary.

10. An electronic device comprising:
a display screen;
a processor configured to:
control the display screen to display a list in a display area, the display area is at least part of a display output area of the display screen;
change a display state of the list in the display area in response to an input operation, wherein the input operation includes at least a moving operation;
determine, in response to an end item of the list coincides with a boundary of the display area, that the display state of the display object satisfies a target display state; and
after determining that the display state of the list satisfies the target display state, control the display screen to stop the end item of the list within the display area with a blank space between the end item of the list and the boundary of the display area, wherein when the list is stopped moving, the end item does not coincide with the boundary of the display area.

11. The electronic device of claim 10, wherein the processor is configured to:
add N empty items after the end item of the list, wherein N is an integer greater than or equal to 1; and
control to scroll the list in response to the moving operation;
wherein:
when the list stops scrolling, the end item of the list is located in the display area, and an empty item in the N empty items coincides with the boundary of the display area; and
N is related to a distance of the end item of the list from the boundary.

12. The electronic device of claim 11, wherein the N empty items include empty item 1 to empty item N in sequence in the moving direction of the list.

13. The electronic device of claim 10, wherein the processor is configured to:
in response to the moving operation, control to scroll the list and to change the display area from a first area to a second area, where the first area includes the second area; and
when the list stops scrolling, control the end item of the list to coincide with a boundary of the second area;
wherein a position of a boundary of the first area and a position of the boundary of the second area are different.

14. The electronic device of claim 10, further comprising:
a collection device configured to collect sensing parameters indicative of a posture of the display screen;
wherein if the sensing parameters indicating that the display screen is in a first posture, whether the display state of the list satisfies the target display state is determined.

15. The electronic device of claim 14, further comprising:
the list corresponds to an application program;
the application program is configured to occupy the display output area of the display screen to a maximum extent; and
the stop position of the end item is related to a folding position of the display screen in the first posture.

16. The electronic device of claim 14, wherein:
the boundary of the display area is parallel to a folding reference line, where the folding reference line represents a folding position of the display screen in the first posture.

17. The electronic device of claim 10, wherein:
the display output area displays the entire display area of the list.

18. The electronic device of claim 10, wherein:
the display output area displays a part of the display area of the list, a remaining part of the display area including a boundary.

19. The method of claim 2, wherein the N empty items are located in the display area and are not visible to a user.

20. The method of claim 2, wherein no empty item is added to the end of the list when the display state of the list is determined to not satisfy the target display state.

* * * * *